US005602464A

United States Patent [19]
Linkowsky et al.

[11] Patent Number: 5,602,464
[45] Date of Patent: Feb. 11, 1997

[54] BIDIRECTIONAL POWER CONVERTER MODULES, AND POWER SYSTEM USING PARALLELED MODULES

[75] Inventors: Frank A. Linkowsky, Jamesburg, N.J.; John D. Bingley, Yardley, Pa.

[73] Assignee: Martin Marietta Corp., East Windsor, N.J.

[21] Appl. No.: 505,939

[22] Filed: Jul. 24, 1995

[51] Int. Cl.$^6$ ..................................................... G05F 1/445
[52] U.S. Cl. ........................ 323/272; 323/224; 323/282; 307/43
[58] Field of Search ................................. 323/222, 224, 323/271, 272, 282, 284, 285, 906; 307/43

[56] References Cited

U.S. PATENT DOCUMENTS

| | | | |
|---|---|---|---|
| 3,317,809 | 5/1967 | Bowers et al. | 320/30 |
| 3,696,286 | 10/1972 | Ule | 323/15 |
| 3,790,816 | 2/1974 | Berman | 307/149 |
| 3,816,804 | 6/1974 | Cardwell, Jr. | 320/9 |
| 4,143,282 | 3/1979 | Berard, Jr. et al. | 307/43 |
| 4,257,090 | 3/1981 | Kroger et al. | 363/65 |
| 4,347,474 | 8/1982 | Brooks et al. | 323/224 |
| 4,766,364 | 8/1988 | Biamonte et al. | 323/272 |
| 4,860,188 | 8/1989 | Bailey et al. | 363/65 |
| 4,877,972 | 10/1989 | Sobhani et al. | 307/43 |
| 4,924,170 | 5/1990 | Henze | 323/272 |
| 4,947,310 | 8/1990 | Kawabata et al. | 363/71 |
| 5,138,249 | 8/1992 | Capel | 323/285 X |
| 5,193,054 | 3/1993 | Galloway et al. | 363/72 |
| 5,233,287 | 8/1993 | Lenk | 323/268 |
| 5,319,536 | 6/1994 | Malik | 363/65 |
| 5,359,280 | 10/1994 | Canter et al. | 323/282 |

*Primary Examiner*—Peter S. Wong
*Assistant Examiner*—Y. J. Han
*Attorney, Agent, or Firm*—W. H. Meise; C. A. Berard; S. A. Young

[57] ABSTRACT

A bidirectional power converter array has overall voltage feedback, an error signal generator, and plural bidirectional power converter modules. Each module of the array includes a series inductor and local feedback based upon the inductor current. Each module also has a resistive current sensor, providing wideband local feedback. A low-pass filter is coupled to the current sensing resistor to reduce switching noise. The low-pass filter also reduces the bandwidth of the local feedback signal, so interactions with the overall feedback occur, which may result in instability. A winding transformer-coupled to the series inductor generates AC signal representing high-frequency components of the inductor current, relatively free of switching noise. The AC current sample is added to the low-frequency components derived from the resistor and low-pass filter, to form a low-noise local feedback signal, with sufficient bandwidth to reduce unwanted interactions with the overall system feedback. The feedback signals may be currents summed at a node. The combination of overall voltage feedback which is converted to local current feedback in each module allows modules to be paralleled without any adjustments to the system or to the individual modules.

3 Claims, 4 Drawing Sheets

BIDIRECTIONAL POWER CONVERTER MODULES, AND POWER SYSTEM USING PARALLELED MODULES

FIELD OF THE INVENTION

This invention relates to bidirectional power converters for converting power among electrical storage devices and sources, and more particularly between batteries and solar panels, and particularly to such converters which are made in a modular form, and which can be paralleled in an overall feedback loop for increased power-handling capability.

BACKGROUND OF THE INVENTION

U.S. Pat. No. 4,143,282, issued Mar. 6, 1979 in the name of Berard, Jr., et al., describes a bilateral or bidirectional power converter described as being for use in a spacecraft application, in which a common inductor is switched under the control of a pulse-width modulator, so as to operate in a buck mode when coupling power from a high-voltage electrical source to a low-voltage electrical source, and to operate in a boost mode when coupling power from the low-voltage source to the high-voltage source. The increasingly stringent power requirements being placed upon spacecraft, in conjunction with reliability and cost considerations, makes it imperative to find some way to manifest a spacecraft power system which is at once inexpensive, and capable of operation at widely varying load levels on different spacecraft.

SUMMARY OF THE INVENTION

A bidirectional power converter assemblage or array includes an overall voltage feedback, a voltage error signal generator, and one or more bidirectional power converter modules. Each bidirectional power converter module of the array includes a series inductor and local feedback. The local feedback based upon the inductor current, and each module includes a resistive current sensor, which provides a wideband feedback signal for the local feedback control. The bandwidth of the local feedback signal from the resistive current sensor extends from direct current (DC) to a high frequency. In order to reduce power bus noise attributable to switching noise picked up by the resistive current sensor, a low-pass filter is coupled to the current-sensing resistor, which attenuates the switching noise at the higher frequencies. However, the low-pass filter also reduces the bandwidth of the local feedback signal, so that unwanted interactions with the overall feedback occur, which may result in instability. A winding is transformer-coupled to the series inductor, for generating an alternating- current-coupled (AC) signal representing high-frequency components of the inductor current, relatively free of switching noise. The transformer-derived high-frequency components of the current sample are added to the low-frequency components derived from the resistor and low-pass filter, to form a low-noise local feedback signal, with sufficient bandwidth to reduce unwanted interactions with the overall system feedback.

The bidirectional power converter array or assemblage meets the requirement for expandability, because only one bidirectional power module may be used when the electrical load requirements are low, or a plurality of such modules may be paralleled to meet higher power requirements. Since each module is identical, it must only be space-qualified once, thereby reducing the cost of making a power system of any size for a new spacecraft, and reduces the risk of error. Since the modules are paralleled, any failure of one module may be adjusted for by taking that particular module off-line, and operating with reduced power capability. This in turn further enhances the reliability of the spacecraft so made.

In a particular embodiment of the invention, the local control is based upon the sum of feedback signals in the form of currents applied to a node. In this embodiment, the overall feedback signal voltage, the resistor-derived and the transformer-derived local feedback voltages are all converted to corresponding currents before application to the current node. This form of feedback allows parallel application of the overall voltage feedback to a control input port of each individual bidirectional power converter module, and allows paralleling of the power output ports of the modules without "current hogging" or uneven distribution of the load among the individual modules.

DESCRIPTION OF THE INVENTION

Figure 1:
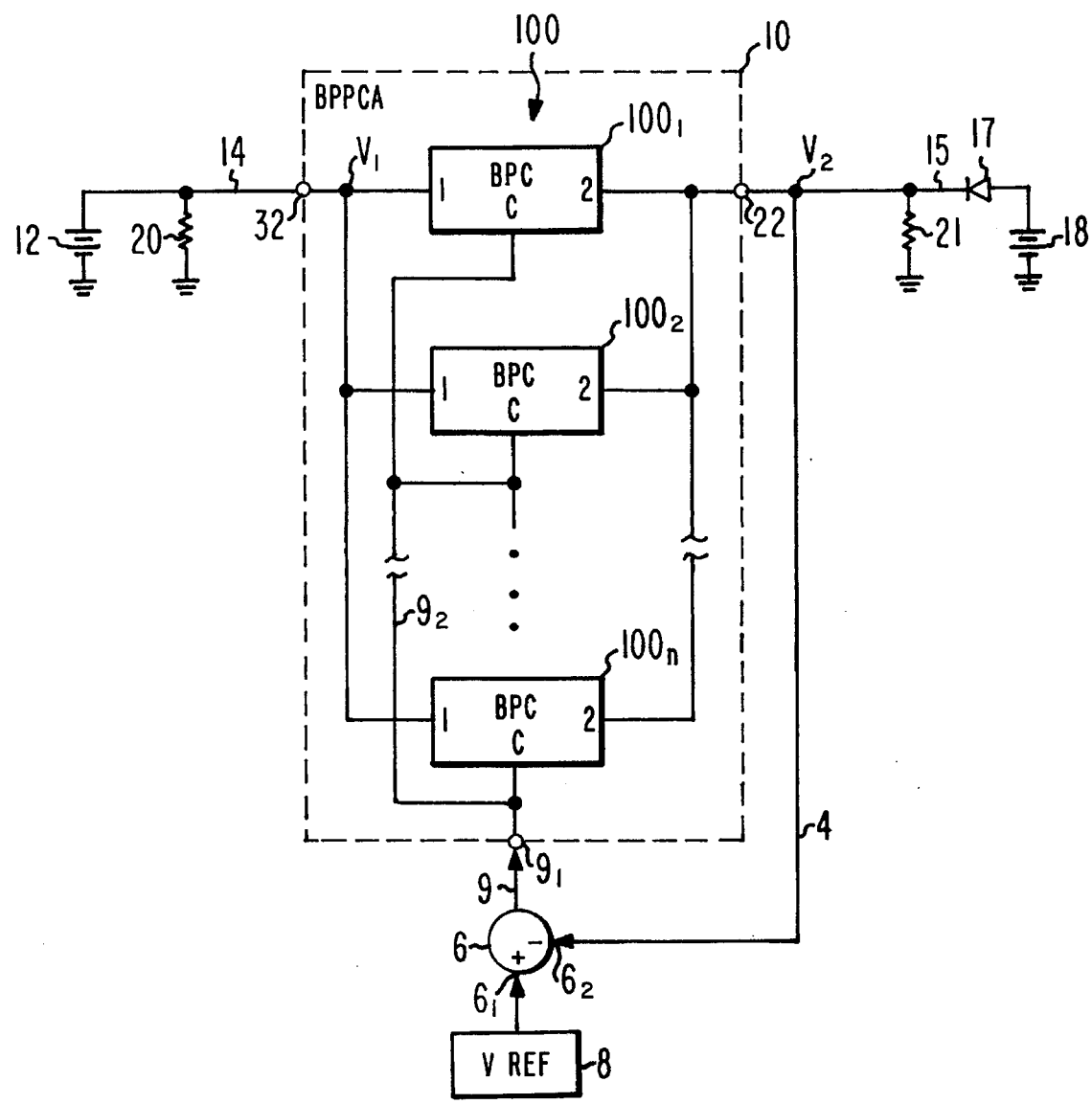
FIG. 1 is a simplified overall block diagram of a bidirectional power converter array or apparatus, illustrating a plurality of individual bidirectional power converter modules with paralleled power ports, and with common overall feedback.

FIG. 1 is a simplified overall block diagram of a bidirectional power control system according to the invention. In FIG. 1, a first source of electrical energy in the form of a voltage source 12 is coupled by a power bus 14 across a resistor 20, which may represent the internal resistance of the source, or which may represent an external load, such as a spacecraft payload, or the combination of both. At the right of FIG. 1, a further source 18 of electrical energy is coupled by a diode 17 and a power bus 15 across a resistor 21, which represents an external load, or another portion of an external load, such as a spacecraft payload, or the combination of both. In one embodiment of the invention, source 18 is a solar panel, and source 12 is a battery.

The voltage of source 12 is always less than the voltage on bus 15. The voltage of source 18 may be higher than, or less than the voltage on bus 15. If the power requirements of the loads, and the maximum amount of power to be transferred between the sources, are small enough to be handled by a single bidirectional power converter, the power converter described in the above-mentioned Berard, Jr. et al. patent will suffice. If a new spacecraft is then required, however, in which the power requirements are greater than those of the single power converter, there is no convenient way to fulfill the requirement, other than producing a new bidirectional power converter module, and space-qualifying that new module, which is both expensive and time-consuming. In accordance with the invention, the flow of electrical energy (power) between sources 12 and 18 is controlled by a bidirectional power converter array or arrangement illustrated as a block 10. As illustrated in FIG. 1, bidirectional power converter arrangement 10 includes power ports 22 and 32 connected to buses 15 and 14, respectively, and also includes a control signal input port $9_1$. A feedback path 4 is coupled between power bus 15 and an inverting (−) input port $6_2$ of an error signal generator 6. A source 8 of reference voltage is coupled to noninverting (+) input port $6_1$ of error signal generator 6. Error signal generator 6 subtracts the current output voltage from the reference voltage, to generate an error signal voltage, which is applied over a signal path 9 to control input port $9_1$ of bidirectional power converter arrangement 10. Bidirectional power converter arrangement 10 contains one or more bidirectional power converter modules 100, which are designated $100_1$, $100_2$, ... $100_n$. Each module $100_x$, where the subscript X represents any one of the modules, has its first power port 1 connected to power port 32 of bidirectional power converter arrangement 10, whereby the first power ports 1 of all the bidirectional power converter modules $100_1$, $100_2$, ... $100_n$ are connected in parallel. Similarly, each module $100_x$ has its second power port 2 connected to power port 22 of bidirectional power converter arrangement 10, whereby the second power ports 2 of all the bidirectional power converter modules $100_1$, $100_2$, ... $100_n$ are connected in parallel.

If the modules $100_x$ of the arrangement of FIG. 1, as so far described, were identical to those of the Berard, Jr. et al. patent, each module would attempt to regulate the voltage in accordance with its own internal reference, with the result that small differences would cause some of the converters to attempt to supply more than their share of the full load, subjecting them to excess stress, while other converters would carry little load.

Overall error voltage feedback is provided in the arrangement of FIG. 1 by a conductor $9_2$, which connects the control input port c of each bidirectional power converter $100_x$ in parallel with the other input ports c, and with the control input port $9_1$ of bidirectional power converter arrangement 10. While this provides a common error voltage for all of the bidirectional power converters $100_1$, $100_2$, ... $100_n$, the problem of current hogging is not thereby solved, because of differences in the output impedances of the individual modules.

Figure 2:
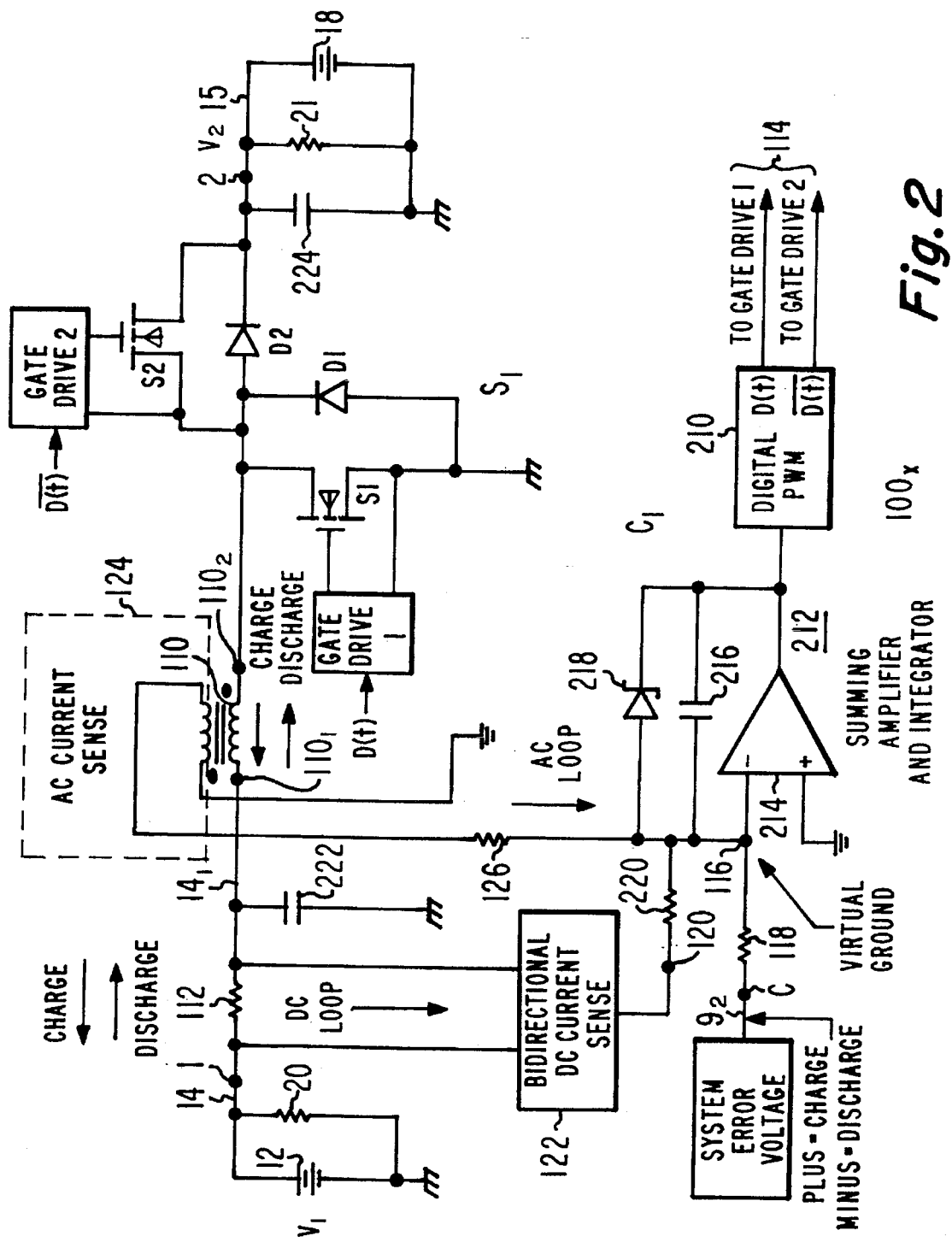
FIG. 2 is a simplified diagram, in block and schematic form, of one of the bidirectional power converter modules of the arrangement of FIG. 1.

FIG. 2 is a simplified diagram, in block and schematic form, of a module $100_x$ in accordance with an aspect of the invention. Elements of FIG. 1 corresponding to those of FIG. 2 are designated by like reference numerals. In FIG. 1, an inductor 110 has terminals $110_1$ and $110_2$. Inductor terminal $110_1$ is connected, by way of a path or bus $14_1$, a low-value current-sensing resistor 112, a further path 14, and power port 1 to source 12. Inductor terminal $110_2$ is connected to a controllable power switch S1, corresponding to the switch of the above-mentioned Berard, Jr., et al. patent, and switch S1 in turn is connected to both ground potential and to power port 2.

The arrangement of FIG. 2 also includes a control circuit C1, which includes a digital pulse-width modulator (PWM) 210, which produces mutually antiphase gate drive signals on a pair of signal paths 114, for application to the individual switches (not separately designated) of switch S1. Pulse-width modulator 210, in turn, is driven by a summing amplifier and integrator 212, which includes an operational amplifier 214 having its noninverting (+) input terminal coupled to ground, and also having a capacitor 216 coupled between its output terminal and its inverting (−) input port, and an avalanche or Zener diode 218 coupled across the capacitor. The noninverting input port of summing amplifier and integrator 212 is designated 116, and, as known, constitutes a virtual ground when summing amplifier and integrator 212 is connected as illustrated. The pulse-width of the switching of power switch S1 is responsive to the sum (or net) of the currents flowing into port 116 from resistors 118, 126, and 220. When conventional or positive current tends to flow into port 116, the pulse width of PWM 210 adjusts, in a manner which tends to operate switch S1 and inductor 110 in a buck mode, to transfer electrical energy from source 18 to source 12. Similarly, when positive current tends to flow away from port 116 toward resistors 118, 126, and 220, the pulse-width is readjusted to tend to operate switch S1 and inductor 110 in a boost mode, to transfer electrical energy from source 12 to source 18.

Current-sensing resistor 112 of FIG. 2 generates a voltage which is proportional to the instantaneous current flow, which voltage is therefore representative of the sensed current. Those skilled in the art know that current and voltage generally occur together, and that the difference between a "current" source and a "voltage" source lies in the impedance of the source, with a voltage source displaying a lower source impedance than a current source; since resistor 112 has a low resistance, it also has a low impedance and therefore constitutes a "voltage" source. The current-representative sense voltage generated by current flow through resistor 112 is "floating," in that neither end of the resistor is at a reference voltage level. The floating signal voltage is [provided with a ground reference] in a block 122, and applied by way of a port 120 to a resistor 220, which converts the sensed voltage to a current, and applies the current to port 116.

In operation of the arrangement of FIGS. 1 and 2, system error voltage is applied over signal paths $9_2$ to control voltage input ports c of each module. Within each module, a resistor 118 converts the system control voltage into a current, and applies the current to input port 116 of the local control system C1. Summing amplifier and integrator 212 of each module compares the current from its resistor 118 with the current from its resistor 220, and adjusts the pulse-width applied to power switch S1 in a manner which tends to maintain the voltage at port 116 near ground. This, in turn, requires that the current through resistor 220 be equal in magnitude and opposite in sign to the current in resistor 118. Since the current in resistor 220 is proportional to the current sensed by sensing resistor 112, which in turn is equal to the current in inductor 110, the magnitude of the voltage applied to control input port c of each module directly controls the current at power ports 1 and 2.

Switching noise in the arrangement of FIG. 2 is attenuated by capacitors 222 and 224. Nevertheless, current components attributable to the switching of switch S1 tend to arise, and to flow through current-sensing resistor 112. These switching noise components appear in the sensed voltage across resistor 112, and therefore also appear in the current through resistor 220. The integrating function of summing amplifier and integrator 212 of each module tends to attenuate the current components, but sufficient integration to remove sufficient noise also tends to reduce the bandwidth of the local (in-module) feedback. This bandwidth reduction is disadvantageous, because it tends to bring the bandwidth of the local feedback loop toward the bandwidth of the overall feedback loop. This, in turn, tends to result in undesirable interaction among the modules, and can result in oscillation of the system. It has been found that it is desirable to have the bandwidth of the local feedback loop about ten or more times higher than the bandwidth of the overall feedback loop to minimize these interactions.

Figure 3A:
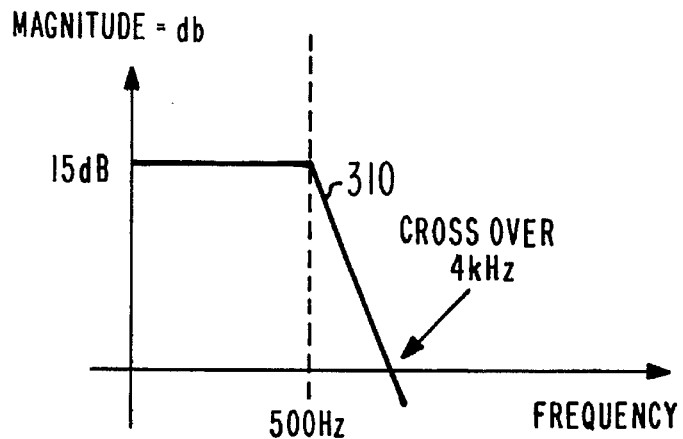
FIGS. 3a, 3b, and 3c represent the amplitude component of Bode plots of the response of the DC current loop, the AC current loop, and the sum of the DC and AC current loops.

According to an aspect of the invention, the local current sense signal flowing in resistor 220 is low-pass filtered before it is summed with the overall feedback signal from resistor 118. This is accomplished by incorporating a low-pass function into block 122. This low-pass function has a characteristic of the invention, which is illustrated by plot 310 of FIG. 3a. The low-pass function of block 122 of FIG. 2 attenuates switching noise in the sensed current from resistor 112 before it is summed. The breakpoint of the integration function of summing amplifier and integrator 212 can now be raised to a higher frequency, as a result of which the response of the local loop to the overall feedback signal is much faster or improved. However, the bandwidth of the local loop is still low, with its concomitant problems.

Figure 3B:
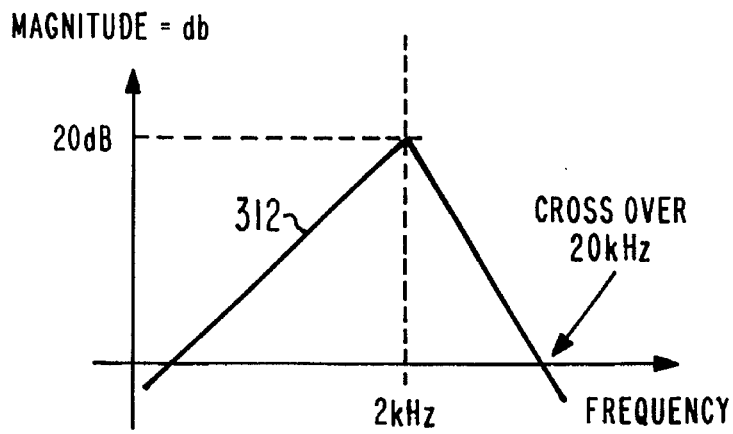

According to a further aspect of the invention, additional current sensing is provided by a winding 124, which is magnetically coupled to power inductor 110, to form a transformer. Current flow in inductor 110 is transformer-coupled to sense winding 124. As known to those skilled in the art, only alternating components of current are coupled from inductor 110 to sense winding 124, and DC components are not so coupled. This characteristic of transformer coupling results in a transfer function such as that illustrated as 312 in FIG. 3b. The current sensed by winding 124 tends to have low switching noise, because of the inductive nature of the inductor and the winding. Thus, the transformer coupling provides sampled high-frequency or AC components of the current through inductor 110, with relatively small amounts of high-frequency or switching noise as compared with resistor 112.

Figure 3C:
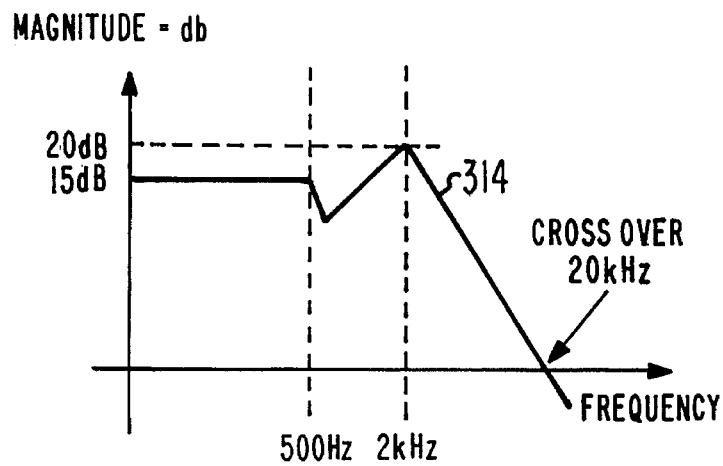

The high-frequency components of the current through inductor 110 sensed by transformer-coupled winding 124 are converted into a corresponding current by a resistor 126, and the current so converted is applied to current-summing control circuit input port 116, together with the low-frequency components of the sensed signal from resistor 112. FIG. 3c illustrates as 314 the transfer function of the combined current sense signals from resistor 112 and transformer-coupled winding 124.

Figure 4:
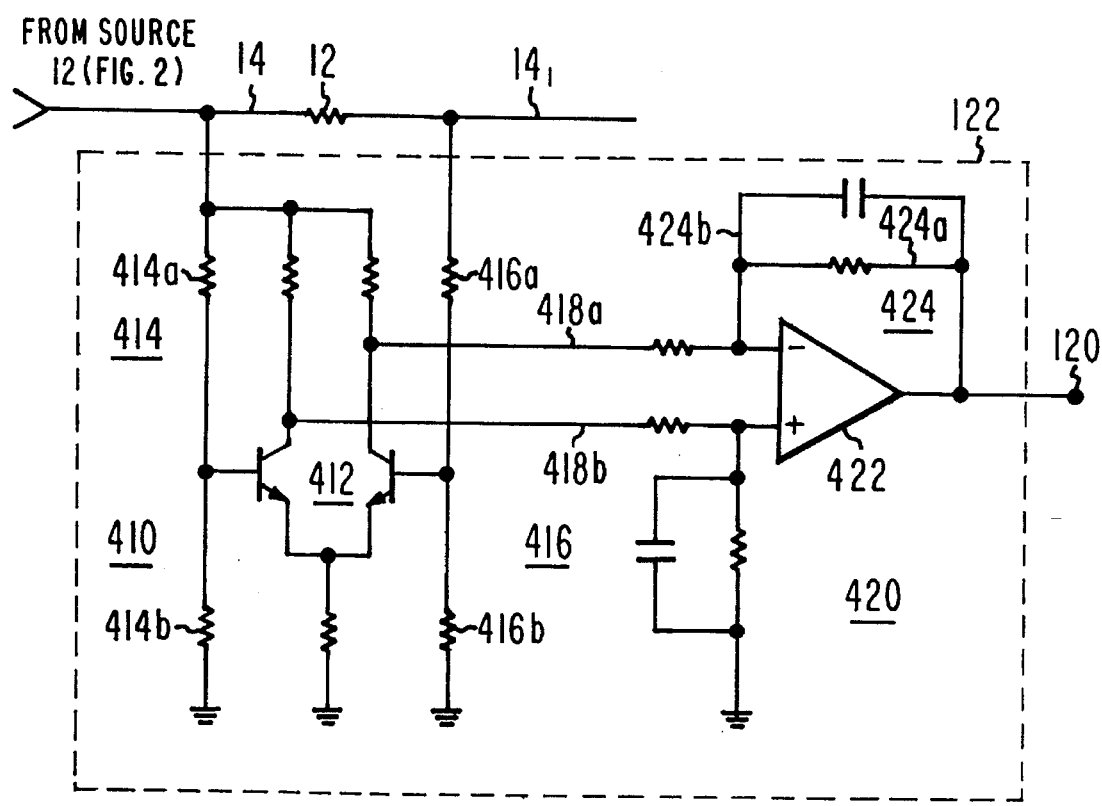
FIG. 4 is a simplified diagram of a portion of the arrangement of FIG. 2.

FIG. 4, is a simplified schematic diagram of bidirectional DC current sense block 122 of FIG. 2, which changes the reference level of the voltage appearing across resistor 112, and which includes a low-pass filter function. In FIG. 4, a differential amplifier designated generally as 410 includes a pair of transistors 412, with emitters coupled together, and by way of a resistor to ground. The bases of one of the transistors of pair 412 is fed by a first voltage divider 414, including series-connected resistors 414a and 414b, connected between conductor 14 and ground. The other transistor of pair 412 is fed by a second voltage divider 416, including resistors 416c and 416b connected between conductor 14, and ground. Differential amplifier 410 produces an offset voltage difference across its output conductors 418a and 418b, for application to an active differential-input low-pass filter 420. Low-pass filter 420 includes an operational amplifier 422, with a feedback network 424 extending from its output terminal 120 to its inverting input terminal. Feedback network 424 includes a resistor 424a which, together with an input resistor, establishes the low-frequency gain of the filter 420, and a capacitor 424b, in conjunction with the resistor, established the filter characteristic 310 of FIG. 3a.

The invention, then, lies in a bidirectional paralleled power converter apparatus or array (10), which is adapted to be coupled between a first source of direct electrical energy (12) and a second source of electrical energy (18), where the voltage of the first source of direct electrical energy is less than the voltage of the second source of direct electrical energy. The converter (10) comprises a source of power converter apparatus reference voltage (8) and a power converter apparatus error signal generator (6). The power converter apparatus error signal generator (6) includes an output port (9), a first input port (6$_1$) coupled to the source of power converter apparatus reference voltage (8), and also includes a second input port (6$_2$) coupled to receive a sample of power converter apparatus feedback voltage. The power converter apparatus error signal generator (6) generates, at its output port (9), a power converter apparatus error signal representative of voltage error. The converter apparatus includes at least one bidirectional switching power converter (100), which includes a first power port (1) coupled to the first source of direct electrical energy (12), and a second power port (2) coupled to the second source of direct electrical energy (18). Each bidirectional switching power converter (100) further includes a feedback signal input port (c) coupled to the output port (9) of the power converter apparatus error signal generator (6). The bidirectional switching power converter (100) further comprises (a) a power inductor (110) including first (110$_1$) and second (110$_2$) terminals;

(b) a power coupler (S1, 14$_1$) coupled to the first (1) and second (2) power ports and to the first (110$_1$) and second (110$_2$) terminals of the inductor (110), for, in a first (boost) mode of operation, periodically coupling the inductor (110) alternately (i) across the first power port (1) and (ii) between the first (1) and the second (2) power ports, for transferring energy from the first source of direct electrical energy (12) to the second source of direct electrical energy (18), and for, in a second (buck) mode of operation, periodically coupling the inductor (110) (i) between the first (1) and second (2) power port and (ii) across the first power port (1), for transferring energy from the second source of direct electrical energy (18) to the first source of direct electrical energy (12), and for changing between the first and second modes of operation under the control of the duty cycle of a switching control signal;

(c) a resistance-type current sensor (112) serially coupled with the inductor (110), for generating a current-representative voltage representative of the current flowing in the inductor (110);

(d) a control arrangement (C$_1$) including a first input port (116), and an output port (114), the output port (114) of the control arrangement (C$_1$) being coupled to the power coupler (S1, 14$_1$), and responsive to the sum of currents applied to the first (116) input port of the control arrangement (Cl), for generating the switching control signal for the power coupler (S1);

(e) a second coupler (118) coupled to the first input port (116) of the control arrangement (Cl) and to the feedback signal input port (c) of the bidirectional switching power converter (100), for converting the power converter apparatus error signal into a power converter apparatus control current, and for coupling the power converter apparatus control current to the first input port (116) of the control arrangement (Cl);

(f) a third coupler (120) coupled to the resistance-type current sensor (112) and to the first input port (116) of the control arrangement (Cl), for converting the current-representative voltage representative of the current flowing in the inductor into an inductor-current representative current, and for coupling the inductor-current representative current to the first input port (116) of the control arrangement (Cl).

As a result of the invention as so far described, switching noise associated with the current-representative voltage representative of the current flowing in the power inductor tends to destabilize the bidirectional switching power converter. The bidirectional switching power converter (100) further comprises (g) a low-pass filter (122) coupled to the resistance-type current sensor (112), for low-pass filtering the current-representative voltage representative of the current flowing in the inductor, to thereby produce a signal representative of the low-frequency components of the current in the inductor, and for applying the signal representative of the low-frequency components of the current in the inductor to the first input port (116) of the control arrangement (C1).

The addition of the low-pass filter (122) stabilizes the bidirectional switching power converter, but tends to destabilize the paralleled power converter apparatus as a whole, because the bandwidth of the local inductance-current representative current feedback signal is less than the bandwidth of the power converter apparatus error signal. Each bidirectional switching power converter according to the invention further comprises (h) a transformer-type current sensor (124, 126) magnetically coupled to the inductor (110), and coupled to the first input port (116) of the control arrangement (C1), for generating a high-frequency inductor signal current representative of the high-frequency components of current flowing in the inductor (110), and for coupling the high-frequency inductor signal current to the first input port (116) of the control arrangement (C1).

As a result of this combination, signals representative of both the low-frequency components and the high-frequency components of the current in the inductor are applied to the first port of the control arrangement, the bandwidth of the bidirectional switching power converter (100) is increased, and the paralleled power converter apparatus is thereby stabilized.

Other embodiments of the invention will be apparent to those skilled in the art. For example, a separate current transformer coupled in series with the power inductor may be used instead of a winding transformer-coupled to the power inductor. While a particular arrangement of FETs and diodes has been illustrated as S1 in FIG. 3, any equivalent arrangement may be used, as for example a bipolar transistor/diode arrangement, and actively controlled devices may be used instead of diodes. While particular frequency characteristics have been described and illustrated in conjunction with FIGS. 3a, 3b, and 3c, other rolloff frequencies, and a larger number of poles may be used.

What is claimed is:

1. A bidirectional paralleled power converter apparatus for coupling between a first source of direct electrical energy and a second source of electrical energy, the voltage of said first source of direct electrical energy being less than the voltage of said second source of direct electrical energy, said converter comprising:

a source of power converter apparatus reference voltage;

power converter apparatus error signal generating means including an output port, and also including a first input port coupled to said source of power converter apparatus reference voltage and also including a second input port coupled to receive a sample of power converter apparatus feedback voltage, for generating, at said output port of said power converter apparatus error signal generating means, a power converter apparatus error signal representative of voltage error;

at least one bidirectional switching power converter, said bidirectional switching power converter including a first power port coupled to said first source of direct electrical energy, and a second power port coupled to said second source of direct electrical energy, said bidirectional switching power converter further including a feedback signal input port coupled to said output port of said power converter apparatus error signal generating means, said bidirectional switching power converter further comprising:

(a) inductance means including first and second terminals;

(b) power coupling means coupled to said first and second power ports and to said first and second terminals of said inductance means, for, in a first (boost) mode of operation, periodically coupling said inductance means alternately (i) across said first power port and (ii) between said first and said second power ports, for transferring energy from said first source of direct electrical energy to said second source of direct electrical energy, and for, in a second (buck) mode of operation, periodically coupling said inductance means (i) between said first (1) and said second power port and (ii) across said first power port, for transferring energy from said second source of direct electrical energy to said first source of direct electrical energy, and for changing between said first and second modes of operation under the control of the duty cycle of a switching control signal;

(c) resistance-type current sensing means serially coupled with said inductance means, for generating a current representative voltage representative of the current flowing in said inductance means;

(d) control means including a first input port, and an output port, said output port of said control means being coupled to said power coupling means, and responsive to the sum of currents applied to said first input port of said control means, for generating said switching control signal for said power coupling means;

(e) second coupling means coupled to said first input port of said control means and to said feedback signal input port of said bidirectional switching power converter, for converting said power converter apparatus error signal into a power converter apparatus control current, and for coupling said power converter apparatus control current to said first input port of said control means;

(f) third coupling means coupled to said resistance-type current sensing means and to said first input port of said control means, for converting said current representative voltage representative of the current flowing in said inductance means into an inductance-current representative current, and for coupling said inductance-current representative current to said first input port of said control means;

whereby switching noise associated with said current-representative voltage representative of the current flowing in said inductance means tends to destabilize said bidirectional switching power converter; said bidirectional switching power converter further comprising:

(g) low-pass filtering means coupled to said resistance-type current sensing means, for low-pass filtering said current representative voltage representative of the current flowing in said inductance means, to thereby produce a signal representative of the low frequency components of the current in said inductance means, and for applying said signal representative of the low-frequency components of the current in said inductance means to said first input port of said control means;

which thereby stabilizes said bidirectional switching power converter, but tends to destabilize said paralleled power converter apparatus, because the bandwidth of said inductance-current representative current is less than the bandwidth of said power converter apparatus error signal; said bidirectional switching power converter further comprising:

(h) transformer-type current sensing means magnetically coupled to said inductance means, and coupled to said first input port of said control means, for generating a high frequency inductor signal current representative of the high-frequency components of current flowing in said inductance means, and for coupling said high-frequency inductor signal current to said first input port of said control means;

whereby signals representative of both said low-frequency components and said high-frequency components of said current in said inductance means are applied to said first port of said control means, the bandwidth of said bidirectional switching power converter is increased, and said paralleled power converter apparatus is thereby stabilized.

2. An apparatus according to claim 1, wherein each of said bidirectional power converters is in modular form, whereby additional bidirectional power converter modules may be added to said bidirectional paralleled power converter apparatus, for increasing the power-handling capability of said apparatus, by coupling said first power ports of said bidirectional switching power converter modules together, coupling said second power ports of said bidirectional switching power converter modules together, and coupling said feedback signal input ports of said bidirectional switching power converter modules together.

3. An apparatus according to claim 1, wherein said first source of direct electrical energy is a battery, and said second source of direct electrical energy is a solar panel.

\* \* \* \* \*